May 12, 1931.    C. ELLIS    1,804,389
DELINEATED AREA
Original Filed Oct. 15, 1924
Fig. 1.
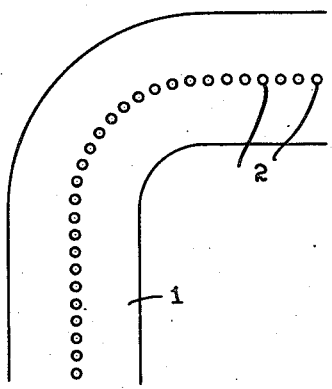
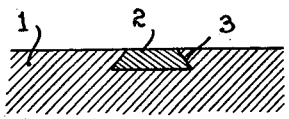
Fig. 2.
Inventor
CARLETON ELLIS.
By Sol Shappirio
Attorney Patented May 12, 1931

1,804,389

UNITED STATES PATENT OFFICE

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA

DELINEATED AREA

Application filed October 15, 1924, Serial No. 743,782. Renewed July 24, 1929.

This invention relates to the process of delineating lines of traffic on highways such for example as oiled macadam roads and to delineated areas resulting from such process and relates particularly to a procedure which permits of the treatment of highways to afford white or light colored dots, lines or other markings of a character more permanent than that secured by the present method of painting the surfaces of highways.

The present method of painting the surface of roads along curves, cross-roads and other places dangerous to traffic brings with it a number of difficulties. When the paint is applied to a surface containing considerable road oil or black tar the seepage of this oil through the surface of the paint quickly discolors it and the lines are soon darkened to such an extent as to be practically obliterated. Another objection is that the mineral oil mixing with the drying oil of the paint retards the drying of the latter. For these and other reasons the employment of paints for the delineation of lines of traffic is an expensive and troublesome method.

According to the present method permanent markers or indicators are obtained by inserting in the surface of the highway slabs of white material preferably a white cement such as magnesium oxychloride or zinc oxychloride cement or a mixture of these. White Portland cement does not have a sufficient degree of whiteness to be as appropriate although it may be used in some cases especially when fortified by the addition of zinc oxide.

In Figure 1 there is shown diagrammatically a portion of a highway with markers therein to indicate lanes of travel; and In Figure 2 a detail in section of one manner of inserting a marker in a highway surface.

The process may be carried out to best advantage by excavating the highway to form a shallow depression say an inch or two inches in depth or deeper if desired to secure a better anchorage. The depression may take the form of the usual geometrical shapes now employed, if so desired. Thus for example circular shapes arranged in series along the road or bands of appropriate width with square or rounded ends may be used or continuous bands extending along the middle of the road around the entire curve or at cross-roads and so forth may be employed. In other words any appropriate shape effective for the purpose may be used.

A mixture of heavy calcined magnesia, that is heavy magnesium oxide and a concentrated aqueous solution of magnesium oxychloride for example of a strength between 20 and 30° Bé. may be mixed to form a paste and trowelled into the cavity. In like manner zinc oxide, preferably the heavier varieties, may be mixed with a concentrated aqueous solution of zinc chloride and likewise trowelled into the cavities and the surface smoothed to make a white tile or placque in the road preferably flush with the surface.

With such cementing agent there may be mixed any suitable kind of a filler such as white sand or other mineral filler or fibrous material to give strength such as asbestos or sawdust.

Methods of making Sorel cement have been frequently described and I do not attempt herein to furnish details relating thereto as the processes are well known in the art, the present invention being concerned with the application to highways of a white cement capable of serving as an indicator and to delineated areas resulting from such procedure.

It is possible in some cases to insert preformed tiles of such cement into the roadway but the disadvantage is the difficulty of securing a good anchoring surface. However should such method be desired it is best to put a bed of cement in the cavity before laying the tile and insert the latter in the soft cement allowing it to set in place.

I do not limit myself to any exact procedure nor to any particular type of cement other than I prefer one which is hard and durable and light in color and having the property of not readily absorbing road oil and becoming discolored. The brilliancy of the magnesium oxychloride and zinc oxychloride cements makes them appropriate for this purpose. Calcium oxychloride cement on the other hand is not as durable and plaster of Paris is more likely to be affected by water. In localities where the rainfall is light plaster of Paris with or without a white pigment may be employed.

In some cases also a waterproofing agent such as calcium or zinc stearate or other so-called metallic soap or other form of waterproofing agent may be incorporated with the cement.

Crushed quartz or white quartz sand which is "sharp" is adapted for use with the oxychloride cements and increases their hardness.

If necessary the tile or placque or casting can be reinforced with wire and also anchoring wires or rods may project through the lower part of the white indicator down into the roadway for some distance in order to more firmly lodge the said indicator in the road-bed.

The insert-markers may be cleaned occasionally by scraping or grinding or by washing with a scouring composition. Furthermore the invention does not preclude painting the surfaces of such markers from time to time if desired.

Another feature which may be carried out in connection with the present invention is that of incorporating at least in the top layer of the marker a substance such as mica or other material which glistens so that the surface of the marker will appear very noticeable when it receives the illumination from headlights. A further elaboration of this is to insert in the wet cement a series of red bulls-eyes or pieces of glass cut with facets which will shine when light impinges thereon and form an effective danger signal. In such elaborations of the invention it may be preferable to use a base or foundation of cheap cementing material and employ only the white and more costly compositions for the upper and exposed portions.

In the case of ordinary concrete roads the insert-markers may be laid at the time the concrete is put in place or cavities may be left by means of forms which are subsequently filled in with the white cement after the surrounding concrete has set.

While not recommended for general purposes mixtures of lime and casein with zinc oxide or similar white pigments incorporated with water glass may be used to form the insert-markers.

As illustrated in Figure 1 of the drawing, a series of circular shapes may be arranged in a series along the middle of a curve in a highway, such series of shapes forming a line indicating the lanes of travel in the road. Further as indicated in Figure 2, the circular shape may be trapezoidal in transverse cross sections the circular shape being indicated at 2 carried by the highway 1, and the side of the shape 2 may be tapered as indicated at 3 in order to anchor the marker in the surfaced highway.

What I claim is:—

1. A delineated area of the highway having cavities of geometrical design filled with a white magnesium oxychloride cement.

2. A delineated area of the highway having cavities of geometrical design filled with a white oxychloride cement.

3. A delineated area of the highway having cavities filled with an oxychloride cement.

CARLETON ELLIS.